(12) United States Patent
Shekhar et al.

(10) Patent No.: US 12,477,444 B2
(45) Date of Patent: Nov. 18, 2025

(54) SERVICE-BASED NETWORK FUNCTION SELECTION FOR ROAMING SCENARIOS INVOLVING MULTIPLE HOME CORE NETWORKS

(71) Applicant: Cisco Technology, Inc., San Jose, CA (US)

(72) Inventors: Ravi Shekhar, Maharashtra (IN); Vimal Srivastava, Karnataka (IN); Irfan Ali, San Francisco, CA (US); Ravi Kiran Guntupalli, Cumming, GA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 335 days.

(21) Appl. No.: 18/329,672

(22) Filed: Jun. 6, 2023

(65) Prior Publication Data
US 2024/0389002 A1 Nov. 21, 2024

(30) Foreign Application Priority Data
May 16, 2023 (IN) .............................. 202341034370

(51) Int. Cl.
*H04W 48/16* (2009.01)
*H04W 60/04* (2009.01)
*H04W 84/04* (2009.01)

(52) U.S. Cl.
CPC ........... *H04W 48/16* (2013.01); *H04W 60/04* (2013.01); *H04W 84/042* (2013.01)

(58) Field of Classification Search
None
See application file for complete search history.

(56) References Cited

U.S. PATENT DOCUMENTS

2018/0234469 A1  8/2018  Kim et al.
2019/0200207 A1  6/2019  Lauster
(Continued)

FOREIGN PATENT DOCUMENTS

CN       114208278 A  *  3/2022  .......... H04W 36/385

OTHER PUBLICATIONS

Machine Translation of CN-114208278-A (Year: 2022).*
(Continued)

*Primary Examiner* — Robert M Morlan
(74) *Attorney, Agent, or Firm* — Edell, Shapiro & Finnan, LLC

(57) ABSTRACT

Provided herein are techniques to facilitate service-based network function (NF) selection for roaming scenarios involving multiple home core networks. In one instance, a method may include obtaining, by a visited public land mobile network (PLMN) from a home PLMN that is to provide a first service for a wireless device, service hosting information that identifies a service hosting data network name and a service hosting PLMN that is to provide a second service for the wireless device in which the service hosting information is obtained by the visited PLMN through registration of the wireless device with the home PLMN. Upon determining that a session for the second service is to be established for the wireless device, the method may include performing a NF query to the service hosting PLMN identified from the service hosting information obtained through the registration in order to identify a NF to facilitate the session.

20 Claims, 5 Drawing Sheets

(56) References Cited

U.S. PATENT DOCUMENTS

| | | | | |
|---|---|---|---|---|
| 2019/0394631 | A1* | 12/2019 | Stojanovski | H04W 8/005 |
| 2020/0137675 | A1 | 4/2020 | Park et al. | |
| 2020/0260401 | A1 | 8/2020 | So | |
| 2022/0312360 | A1 | 9/2022 | Kuppelur et al. | |
| 2025/0126475 | A1* | 4/2025 | Li | H04W 12/084 |

OTHER PUBLICATIONS

3GPP, 5G Advanced, "3rd Generation Partnership Project; Technical Specification Group Services and System Aspects; Procedures for the 5G System (5GS); Stage 2 (Release 18)," 3GPP TS 23.502 V18.1.1, Apr. 2023, 829 pages.

3GPP, 5G Advanced, "3rd Generation Partnership Project; Technical Specification Group Services and System Aspects; System architecture for the 5G System (5GS); Stage 2 (Release 18)," 3GPP TS 23.501 V18.1.0, Mar. 2023, 667 pages.

3GPP, 5G Advanced, "3rd Generation Partnership Project; Technical Specification Group Core Network and Terminals; Numbering, addressing and identification; (Release 18)," 3GPP TS 23.003 V18.1.0, Mar. 2023, 152 pages.

3GPP, 5G Advanced, "3rd Generation Partnership Project; Technical Specification Group Core Network and Terminals; 5G System; Common Data Types for Service Based Interfaces; Stage 3 (Release 18)," 3GPP TS 29.571 V18.1.0, Mar. 2023, 195 pages.

3GPP, 5G Advanced, "3rd Generation Partnership Project; Technical Specification Group Core Network and Terminals; 5G System; Network Function Repository Services; Stage 3 (Release 18)," 3GPP TS 29.510 V18.2.0, Mar. 2023, 363 pages.

3GPP, 5G Advanced, "3rd Generation Partnership Project; Technical Specification Group Core Network and Terminals; 5G System; Unified Data Management Services; Stage 3 (Release 18)," 3GPP TS 29.503 V18.1.0, Mar. 2023, 576 pages.

3GPP, 5G, A Global Initiative, "5G; Procedures for the 5G System (5GS) (3GPP TS 23.502 version 17.8.0 Release 17)," ETSI TS 123 502 V17.8.0, Apr. 2023, 752 pages.

3GPP, 5G, A Global Initiative, "5G; System architecture for the 5G System (5GS) (3GPP TS 23.501 version 17.8.0 Release 17)," ETSI TS 123 501 V17.8.0, Apr. 2023, 575 pages.

3GPP, 5G, A Global Initiative, "5G; 5G System; Unified Data Management Services; Stage 3 (3GPP TS 29.503 version 17.10.0 Release 17)," ETSI TS 129 503 V17.10.0, Apr. 2023, 548 pages.

3GPP, 5G, A Global Initiative, "5G; 5G System; Common Data Types for Service Based Interfaces; Stage 3 (3GPP TS 29.571 version 17.9.0 Release 17)," ETSI TS 129 571 V17.9.0, Apr. 2023, 195 pages.

3GPP, 5G, A Global Initiative, "5G; 5G System; Network function repository services; Stage 3 (3GPP TS 29.510 version 17.9.0 Release 17)," ETSI TS 129 510 V17.9.0, Apr. 2023, 346 pages.

Cisco, "APN-OI-Replacement for Gn-SGSN," SGSN Administration Guide, StarOS Release 21.22, retrieved from https://www.cisco.com/c/en/us/td/docs/wireless/asr_5000/21-22/SGSN-Admin/21-22-sgsn-admin/21-17-SGSN-Admin_chapter_01000.html, on Jun. 5, 2023 (updated Jul. 23, 2020), 6 pages.

3GPP, 5G, A Global Initiative, "Digital cellular telecommunications system (Phase 2+) (GSM); Universal Mobile Telecommunications System (UMTS); LTE; 5G; Numbering, addressing and identification (3GPP TS 23.003 version 17.9.0 Release 17)," ETSI TS 123 003 V17.9.0, Apr. 2023, 154 pages.

3GPP, 5G, A Global Initiative, "5G; System Architecture for the 5G System (3GPP TS 23.501 version 15.3.0 Release 15)," ETSI TS 123 501 V15.3.0, Sep. 2018, 227 pages.

3GPP: "3rd Generation Partnership Project, Technical Specification Group Services and System Aspects, Procedures for the 5G System, Stage 2(Release 15)", 3GPP Standard, Technical Specification, 3GPP TS 23.502, 3rd Generation Partnership Project (3GPP), Mobile Competence Centre, 650, Route Des Lucioles, F-06921 Sophia-antipolis Cedex, France, No. V15.3.0, XP051487017, Section 5.3.2, Service Operations, Sep. 17, 2018, pp. 1-330.

Huawei et al., "SMF Selection in Roaming Case", SA WG2 Meeting #122, S2-174542 TS 23.502 SMF Selection in Roaming Case, 3rd Generation Partnership Project (3GPP), Mobile Competence Centre, 650, Route Des Lucioles, F-06921 Sophia-antipolis Cedex, France, vol. SA WG2, No. San Jose Del Cabo, Mexico, Jun. 26, 2017-Jun. 30, 2017, XP051303387, Retrieved from the Internet http://www.3gpp.org/ftp/Meetings_3GPP_SYNC/SA2/Docs/ on Jun. 25, 2017, The Whole Document, Jun. 25, 2017, pp. 1-13.

International Search Report and Written Opinion for counterpart International Application No. PCT/US2024/028493, mailed Aug. 22, 2024, 14 pages.

* cited by examiner

SERVICE-BASED NETWORK FUNCTION SELECTION FOR ROAMING SCENARIOS INVOLVING MULTIPLE HOME CORE NETWORKS

PRIORITY CLAIM

This application claims the benefit of priority to Indian Provisional Application No. 202341034370, entitled "SERVICE-BASED NETWORK FUNCTION SELECTION FOR ROAMING SCENARIOS INVOLVING MULTIPLE HOME CORE NETWORKS", filed May 16, 2023, the entirety of which application is incorporated herein by reference.

TECHNICAL FIELD

The present disclosure relates to network equipment and services.

BACKGROUND

Networking architectures have grown increasingly complex in communication environments. In particular, mobile communication networks have grown substantially as end users become increasingly connected to mobile network environments. As the number of mobile users increases, efficient management of communication resources and of users becomes more critical.

DETAILED DESCRIPTION

Overview

Provided herein are embodiments through which service-based core network and/or network function (NF) selection can be provided for roaming scenarios in which a wireless device is connected via a radio access to a visited Public Land Mobile Network (VPLMN) and utilizes different services that can be served via multiple home core networks, such as an internet or data service that may be provided via a home Public Land Mobile Network (HPLMN) with which the wireless device has a subscription and at least one other service, such as a voice or Internet Protocol (IP) Multimedia Subsystem (IMS) service that may be provided via a service hosting PLMN (s-PLMN). Other service hosting PLMNs can be envisioned for providing other services for a wireless device in accordance with embodiments herein, such as Internet of Things (IoT) services, cellular vehicle-to-everything (V2X) services, etc.

In at least one embodiment, a computer-implemented method is provided that may include obtaining, by a visited public land mobile network (VPLMN) from a home public land mobile network (HPLMN) that is to provide a first service for a wireless device, service hosting information that identifies a service hosting data network name (DNN) and a service hosting public land mobile network (PLMN) that is to provide a second service for the wireless device, wherein the service hosting information is obtained by the VPLMN through registration of the wireless device with the HPLMN and the service hosting PLMN is different than the HPLMN; and upon determining that a session for the second service is to be established for the wireless device, performing a network function query to the service hosting PLMN identified from the service hosting information obtained through the registration in order to identify a network function of the service hosting PLMN that is to facilitate the session for the second service that is to be provided for the wireless device.

Example Embodiments

Figure 1:
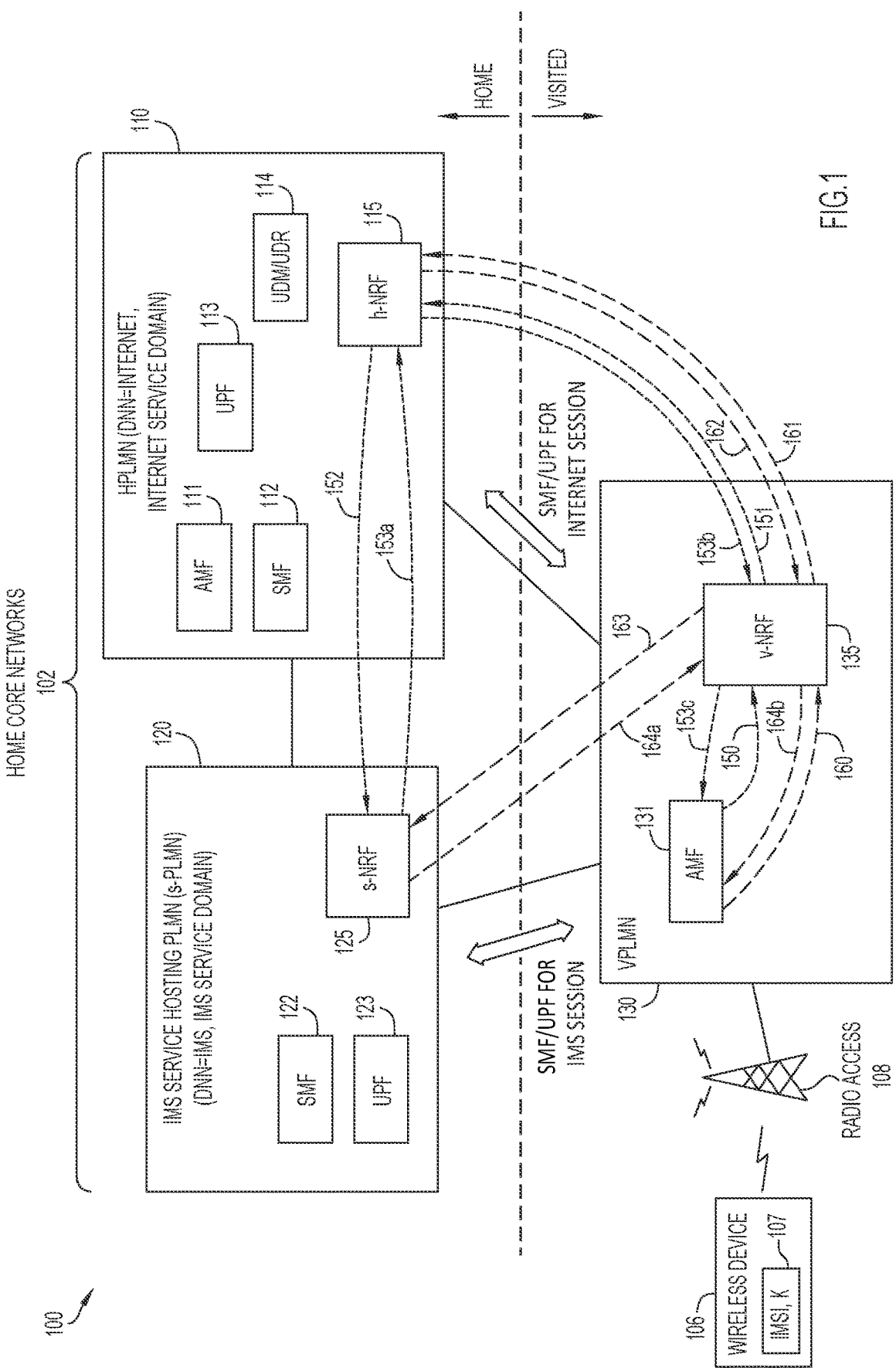
FIG. 1 is a block diagrams illustrating example details associated with current operations that can be used to facilitate service-based network function (NF) selection for roaming scenarios in which multiple home core networks can provide different services for a wireless device that is roaming in a visited network.

Referring to FIG. 1, FIG. 1 is a block diagram of a system 100 illustrating example details for current operations that can be used to facilitate service-based network function (NF) selection for roaming scenarios in which multiple home core networks 102 can provide different services for a wireless device 106 that is roaming in a visited network.

As shown in FIG. 1, in a Third Generation Partnership Project (3GPP) Fifth Generation (5G) implementation, home core networks 102 can be implemented as 5G core (5GC) networks that can include a home Public Land Mobile Network (HPLMN) 110 that provides an internet (data) service and an Internet Protocol (IP) Multimedia Subsystem (IMS) service hosting PLMN (s-PLMN) 120 that provides an IMS or voice service.

For FIG. 1, it is assumed that wireless device 106 has a subscription with HPLMN 110 such that wireless device 106 has an International Mobile Subscriber Identity (IMSI) and authentication/security keys (K), shown in FIG. 1 as IMSI/K 107 that can be provisioned for a Subscriber Identity Module (SIM) card for the wireless device 106 and can also be stored in a subscriber database for the internet service domain, such as within a Unified Data Management (UDM) entity, typically in combination with a Unified Data Repository (UDR), shown in FIG. 1 as UDM/UDR 114. The HPLMN 110 can include other core network functions (NF) such as an Access and Mobility Management Function (AMF) 111, a Session Management Function (SMF) 112, a User Plane Function (UPF) 113, and a home Network Repository Function (h-NRF) 115, among other NFs as may be provided per 3GPP standards. The s-PLMN 120 can also include various core NFs, such as an SMF 122, a UPF 123, and an IMS service hosting domain NRF (s-NRF) 125, among other NFs as may be provided per 3GPP standards.

Generally, the HPLMN 110 can provide data or internet service for the wireless device 106 as the wireless device 106 roams within/is connected via a radio access to a visited network, such as through a radio access 108 (e.g., a gNodeB or the like) to connect to a visited PLMN (VPLMN) 130 such that the wireless device 106 can be served by VPLMN 130. As shown in FIG. 1, the VPLMN 130 can include various core network functions, such as an AMF 131 and a visited NRF (v-NRF) 135, among other NFs as may be provided per 3GPP standards.

For the roaming scenario illustrated in FIG. 1, the home core network for wireless device 106 is considered to be HPLMN 110 that can provide data or internet service, typically identified using a Data Network Name (DNN), such as "DNN=internet," for the wireless device 106 via a data/internet session facilitated by SMF 112 and UPF 113 as the wireless device 106 roams within/is served by VPLMN 130. Thus, HPLMN 110 can be considered an internet service domain for providing internet/data service for wireless device 106. However, the s-PLMN 120 that is in a different domain than the HPLMN 110 is to provide voice/IMS service ("DNN=IMS") for the wireless device such that SMF 122 and UPF 123 can host a session for the wireless device 106 for the s-PLMN 120 to facilitate the IMS service being provided for the wireless device 106. Thus, the s-PLMN 120 can be considered an IMS service domain for an IMS service hosting PLMN that is considered a different service domain than the internet service domain provided via HPLMN 110.

Such a scenario involving multiple home core networks 102 may be utilized when an HPLMN is to host a subscription for a wireless device and also provide an internet/data service for the wireless device, when the wireless device can be in both the IMS service hosting PLMN or the roamed to Visited PLMN, however, IMS service is served by the IMS service domain that is different from the internet service domain. This scenario may find use in consumer 5G-as-a-Service (5GaaS) implementations in which there could be different domains/hosted networks for different services, for example, domain-1 for IMS services, domain-2 for Internet/data services, domain-3 for public safety services, domain-4 for IoT services, etc.

Per-3GPP standards, when wireless device 106 seeks to establish a session for a service that is not served by the HPLMN 110, the VPLMN 130 or, more specifically, the AMF 131 is to select an SMF to serve the session for the service. For example, if the wireless device 106 seeks to establish a session to utilize an IMS service (to be served via s-PLMN 120), the current 3GPP 5G standards-based solution, covered in 3GPP Technical Specification (TS) 29.510 for selecting an SMF to serve a session for providing a service, such as an IMS service, for a wireless device that is served from a domain/PLMN that is different than the HPLMN for the wireless device, is to use either: (a) a hierarchical NRF query via the HPLMN 110 with query forwarding or (b) a hierarchical NRF query via the HPLMN 110 with redirection in order to facilitate identification/selection of the SMF 122 of s-PLMN 120 to host the session for the wireless device for the voice/IMS service.

Consider various 3GPP standards-based operations that are involved for (a) the hierarchical NRF query involve h-NRF 115 with query forwarding. For the examples discussed below, consider that s-PLMN 120 can be identified via a domain name of "5gc.east.mnc<123>.mcc<120>.3gppnetwork.org" merely for purposes of various discussions. Per 3GPP standards, a PLMN can be identified via a PLMN identifier (PLMN-ID) that includes a combination of a 3-digit Mobile Country Code (MCC) and a 2- or 3-digit Mobile Network Code (MNC), formatted in an 'MCC-MNC' format, such as 'XXX-YYY' (for a 3-digit MNC). For example, the PLMN-ID for s-PLMN 120 may be represented as "123-120" for the corresponding domain name "5gc.east.mnc<123>.mcc<120>.3gppnetwork.org" while the PLMN-ID for HPLMN 110 may be represented as "123-110" for a corresponding domain name of "5gc.mnc<123>.mcc<110>.3gppnetwork.org" merely for purposes of various discussions.

For the 3GPP standards-based hierarchical NRF query with query forwarding, as shown at 150, AMF 131 initiates a NF query towards v-NRF 135 to identify an SMF node to serve a session for wireless device 106 for a voice/IMS service to be provided for the wireless device 106, such as "Query(node-type=SMF, DNN=IMS, target-PLMN=HPLMN)," since the wireless device 106 has a subscription being served via HPLMN 110. At 151, v-NRF 135 sends the NF query ["Query(node-type=SMF, DNN=IMS, target-PLMN=HPLMN)" ] (e.g., with the HPLMN being set to '5gc.mnc<123>.mcc<110>.3gppnetwork.org') towards h-NRF 115, which forwards the NF query towards s-NRF 125, such as "Query(node-type=SMF, DNN=IMS, target-PLMN=s-PLMN)" (e.g., with the s-PLMN being set to '5gc.east.mnc<123>.mcc<120>.3gppnetwork.org') as shown at 152. At 153a, s-NRF 125 responds with identifying information for SMF 122, such as a Fully Qualified Domain Name (FQDN) for SMF 122, such as "Response (SMF_FQDN=smf122_5gc.east.mnc<123>.mcc<120>.3gppnetwork.org, smf_profile)" in which the response is relayed back to AMF 131, as shown at 153b and 153c.

Next, consider various 3GPP standards-based operations that are involved for (b) the hierarchical NRF query with redirection. For the 3GPP standards-based hierarchical NRF query with re-direction, as shown at 160, AMF 131 initiates a NF query towards v-NRF 135 to identify an SMF node to serve a session for wireless device 106 for a voice/IMS service that is to be provided for the wireless device 106, such as "Query(node-type=SMF, DNN=IMS, target-PLMN=HPLMN)," since the wireless device 106 has a subscription being served via HPLMN 110. At 161, v-NRF 135 sends the NF query ["Query(node-type=SMF, DNN=IMS, target-PLMN=HPLMN)" ] towards h-NRF 115, which responds with a redirect for the NF query, as shown at 162, such as "Redirect(redirection_target:s-nrf_5gc.east.mnc<123>.mcc<120>.3gppnetwork.org. Receiving the redirect triggers v-NRF 135 to initiate the NF query towards s-NRF 125, such as "Query(node-type=SMF, DNN=IMS, target-PLMN=5gc.east.mnc<123>.mcc<120>.3gppnetwork.org)," as shown at 163. At 164a, s-NRF 125 responds with identifying information for SMF 122 ["Response (SMF_FQDN=smf122_5gc.east.mnc<123>.mcc<120>.3gppnetwork.org, smf_profile)" in which the response is relayed back to AMF 131, as shown at 164b.

While both of the 3GPP standards-based NRF query mechanisms with forwarding or redirect can be used in roaming scenarios (even though the standards only consider non-roaming scenarios), the standards-based me (the 3GPP standards only consider the non-roaming case), there are several issues with the standards-based mechanisms. First, both of the forwarding and the redirect mechanisms involve two NRF queries and both of the queries are inter-domain-a first NRF query from the VPLMN 130 to the HPLMN 110 and then either a second NRF query from the HPLMN 110 to the s-PLMN 120 (for the forwarding mechanism) or a second NRF query from the VPLMN 130 to the s-PLMN 120 (for the redirect mechanism).

In order to address such issues, embodiments herein provide for the ability to provide service hosting domain information to a VPLMN during registration of a roaming subscriber with an HPLMN, as discussed in further detail below with reference to FIG. 2.

Figure 2:
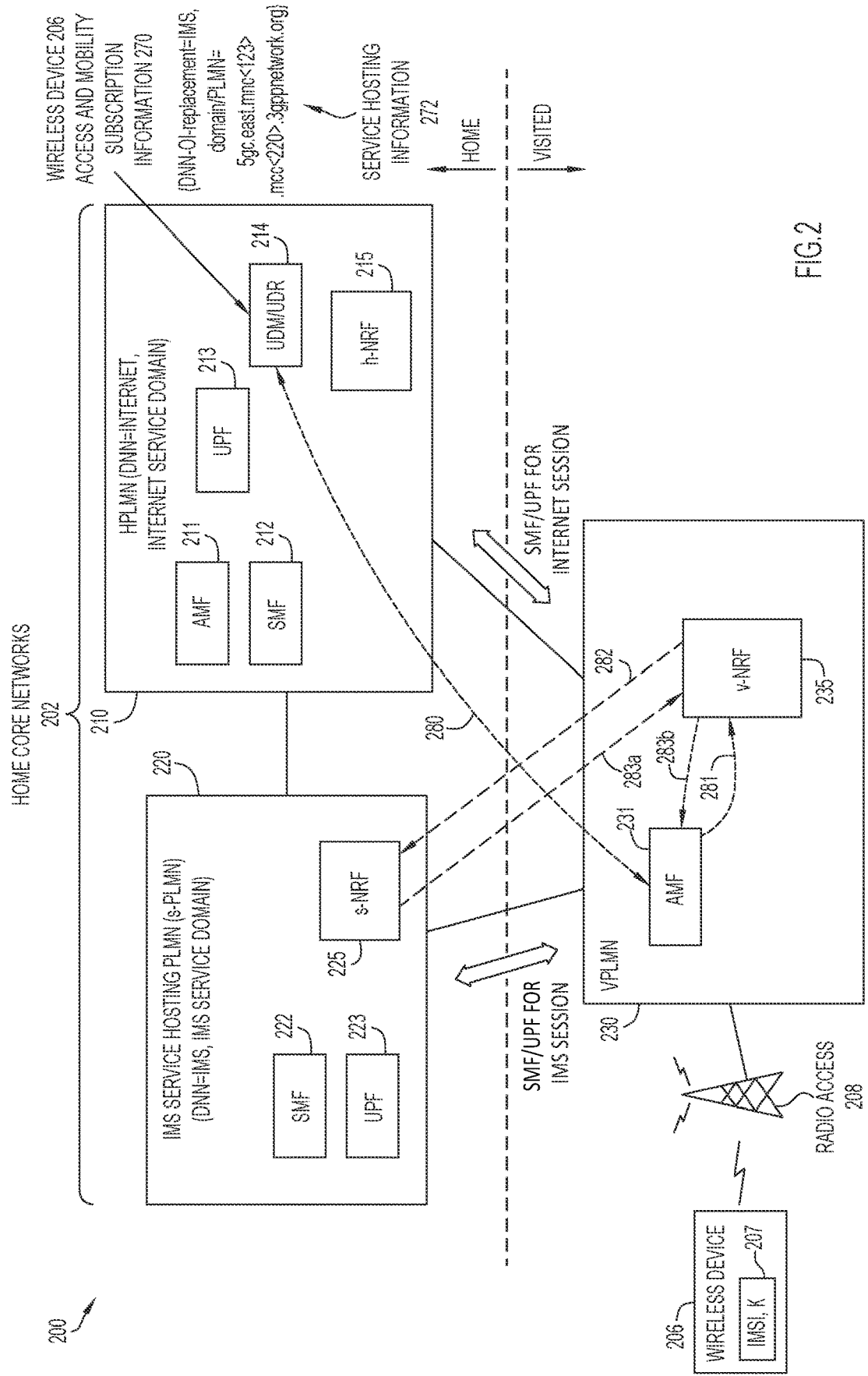
FIG. 2 is a block diagram of a system and operations that may be used to facilitate service-based NF selection for roaming scenarios involving multiple home core networks, according to an example embodiment.

With reference to FIG. 2, FIG. 2 is a block diagram of a system 200 and operations that may be used to facilitate providing service-based NF selection for roaming scenarios involving multiple home core networks, according to an example embodiment. As illustrated in FIG. 2, system 200 may include home core networks 202 implemented as 5GC networks that may include an HPLMN 210 that provides an internet (data) service and an IMS service hosting PLMN (s-PLMN) 220 that may provide an IMS or voice service. For the embodiment of FIG. 2, the PLMN-ID for s-PLMN 220 may be represented as "123-220" for a corresponding domain name of "5gc.east.mnc<123>.mcc<220>.3gppnetwork.org" while the PLMN-ID for HPLMN 210 may be represented as "123-210" for a corresponding domain name of "5gc.mnc<123>.mcc<210>.3gppnetwork.org" merely for purposes of various discussions.

For FIG. 2, it is assumed that wireless device 206 has a subscription with HPLMN 210 such that wireless device 206 has an IMSI and authentication/security keys (K), shown in FIG. 2 as IMSI/K 207 that can be provisioned for a SIM card for the wireless device 206 and can also be stored in a subscriber database for the internet service domain, such as within a Unified Data Management (UDM) entity, which typically utilized in combination with a Unified Data Repository (UDR), shown in FIG. 2 a UDM/UDR 214. Any subscriber data, subscription information, etc. discussed herein may be stored within and/or retrieved from either of a UDM or a UDR in accordance with embodiments herein. The HPLMN 210 can include other core network functions (NF) such as an AMF 211, an SMF 212, a UPF 213, and a home Network Repository Function (h-NRF) 215, among other NFs as may be applicable for a mobile core network. The s-PLMN 220 can also include various core NFs, such as an SMF 222, a UPF 223, and a service hosting domain NRF (s-NRF 225), among other NFs as may be applicable for a mobile core network.

Also shown in FIG. 2 is a VPLMN 230 that may include an AMF 231 and a visited NRF (v-NRF) 235 in which the VPLMN 230 can interface with a radio access 208 (e.g., a gNB, etc.). For the embodiment of FIG. 2, consider that wireless device 206 is roaming within/seeks connection with VPLMN 230 via radio access 208. It is to be understood that HPLMN 210, s-PLMN 220, and VPLMN 230 and any NFs configured therein for each of the networks can interface in any manner as may be applicable for mobile core networks (e.g., per 3GPP standards, etc.).

In accordance with embodiments herein, operations can be facilitated via system 200 that may include augmenting or enhancing access and mobility subscription information 270 maintained for wireless device 206 within UDM/UDR 214 of HPLMN 210 to include service hosting information 272 that can be used to identify one or more different service hosting domains/PLMNs (different 5GC networks) that can be utilized to provide one or more different corresponding services to wireless device 206.

For example, as shown in FIG. 2, access and mobility subscription information 270 for wireless device 206 can include service hosting information 272 that includes service hosting DNN and domain/PLMN identifying information, such as for the IMS service hosting PLMN, s-PLMN 220, that is to provide the IMS or voice service for wireless device 206. In one embodiment, such as shown in FIG. 2, the service hosting information 272 can include a DNN parameter or field and a domain or PLMN parameter field, such as "{DNN-OI-replacement=IMS, domain/PLMN=5gc.east.mnc<123>.mcc<220>.3gppnetwork.org}," in which 'DNN-OI-replacement' may be an information element (IE) or field indicating a DNN operator interface replacement. However, other service hosting information parameters or fields can be envisioned for storing service hosting information for each of one or more services that can be provided for a wireless device via each of one or more corresponding service hosting domains/PLMNs. Further it is to be understood that an 'APN-OI-replacement' IE/field can be used to indicate an Access Point Name (APN) for implementations involving Fourth Generation (4G)/Long Term Evolution (LTE) technologies.

For example, in another embodiment (not shown in FIG. 2), the domain/PLMN parameter or field for a given service hosting domain/PLMN can be identified in a MCC.MNC format (e.g., 123-220), a corresponding domain representation (e.g., 5gc.east.mnc<123>.mcc<220>.3gppnetwork.org), or any combination thereof.

Further, it is to be understood that the "domain/PLMN" parameter or field illustrated for the service hosting information 272 is provided for illustrating purposes only and is not meant to limit the broad scope of embodiments herein. For example, in some embodiments, the service hosting domain/PLMN parameter or field can be identified as "target-PLMN-id" parameter or field.

In some embodiments, service hosting information stored within access and mobility subscription information maintained for wireless devices within the UDM/UDR of an HPLMN may only include a DNN parameter/field/IE that can be formatted to include domain/PLMN identifying information, such as 'mcc123.mnc220!dnn', such that a VPLMN AMF can parse the domain/PLMN identifying information contained within service hosting information obtained by the AMF by parsing out any labels/information contained in the service hosting information that are separated by a delineating character, such as an exclamation ("!") character or any other character (e.g., "@", "%", "^", etc.) that may be used to delineate between DNN identifying information (e.g., IMS) and domain/PLMN identifying information (e.g., MCC.MNC, domaininfo.MCC.MNC (e.g., east.MCC.MNC) and/or any combinations thereof) in order to determine corresponding domain/PLMN identifying information for performing a NF query for a given service hosting domain/PLMN.

Further, although the service hosting information 272 illustrated for FIG. 2 only illustrates information relating to the IMS service hosting PLMN, s-PLMN 220, that is to provide IMS service for the wireless device 206, it is to be understood that any number of service hosting domains/ PLMNs can be identified within service hosting information maintained for a wireless device within a UDM/UDR for a HPLMN with which the wireless device has a subscription (e.g., formatted as {DNN-OI-replacement=service-N, domain/PLMN=service-N.domain} or similar, for a "service-N," such as public safety service, V2X service, IoT service, etc., or in any other format as discussed for different embodiments herein).

In at least one embodiment, a given service hosting domain/PLMN for a given service hosting DNN can be identified within a new "target-PLMN-ID" field that can be provided for DNN information stored within network slice information (typically identified via Single-Network Slice Selection Assistance Information (SNSSAI) of SMF subscription data that can be maintained for wireless device 206 (stored in association with the IMSI of wireless device).

Figure 3:
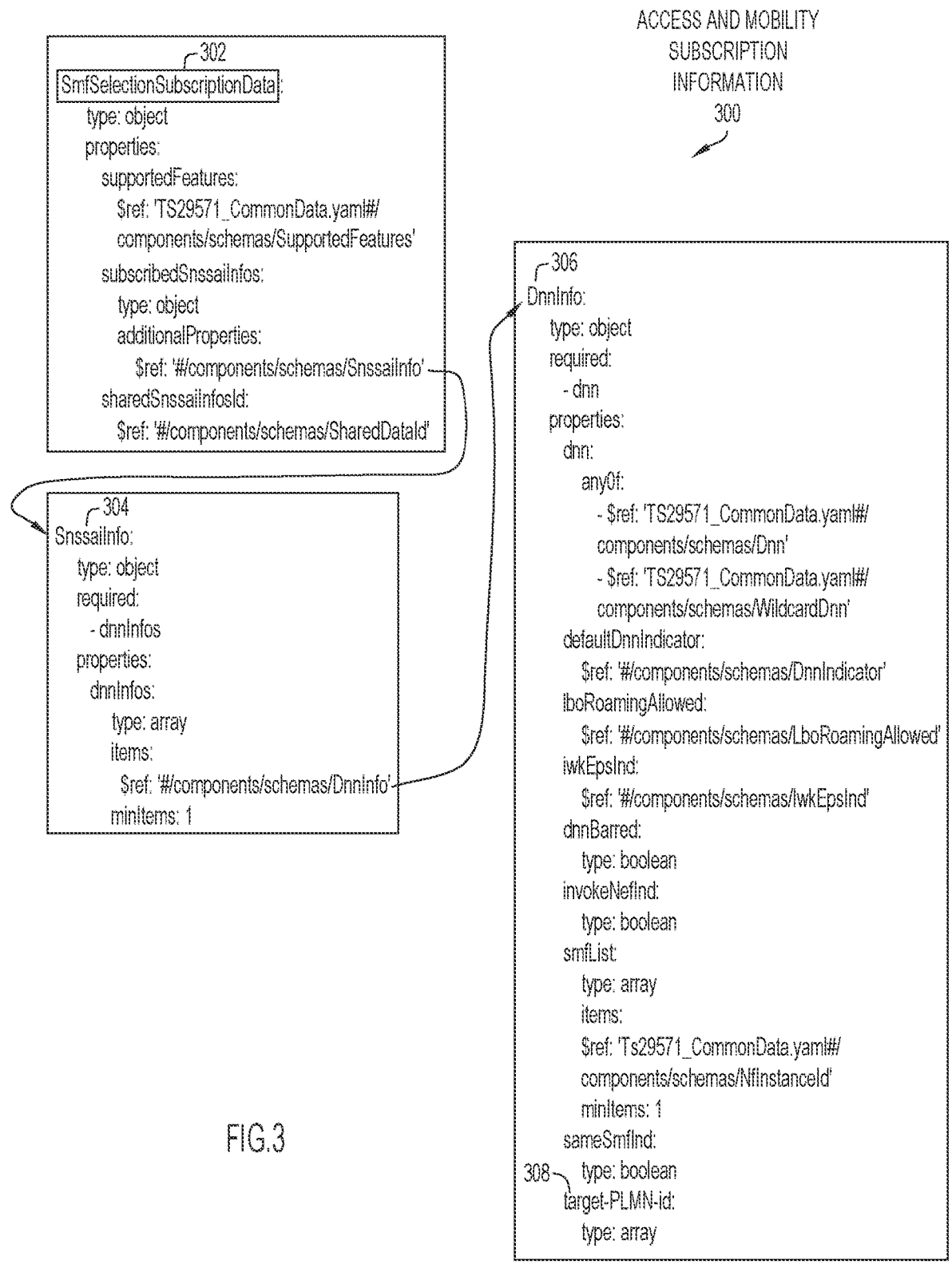
FIG. 3 is a schematic diagram illustrating example details for subscription information for a wireless device can be enhanced to include service hosting information for a service hosting Public Land Mobile Network (PLMN) that is to provide a given service for the wireless device, according to an example embodiment.

For example, FIG. 3 is a schematic diagram illustrating example details for access and mobility subscription information 300 of a wireless device (e.g., wireless device 206) that can be enhanced to include a new target-PLMN-id parameter or field that can be used to identify a given service hosting domain/PLMN, according to an example embodiment. For example, in one embodiment, an "SmfSelection-SusbcriptionData" data structure 302, can include information for an "SnssaiInfo" data structure 304, which can further include information for a "DnnInfo" data structure 306 that, in accordance with at least one embodiment herein, can be enhanced to include a "target-PLMN-id" field or parameter 308 in which service hosting domain/PLMN identifying information for a given service hosting DNN can be provided within the "target-PLMN-id" field or parameter 308. Thus, in at least one embodiment, the DNN-OI-replacement parameter/field/IE of service hosting information sent to a VPLMN AMF can be set to the DNN information identified in the DnnInfo data structure 306 and the domain/PLMN parameter/field/IE of the service hosting information can be set to the target-PLMN-id field or parameter 308. Other variations can be envisioned.

Returning to the embodiment of FIG. 2, broadly during operation of system 200 in accordance with certain embodiments provided herein, service hosting information 272 can be provided to the AMF 231 of VPLMN 230 by the UDM/UDR 214 of HPLMN 210 when the wireless device 206 registers with HPLMN 210 (for connection to VPLMN 230) such that the AMF 231 can be provided the service hosting domain/PLMN for a given service hosting DNN that is to provide a given service for the wireless device 206. The AMF 231 of VPLMN 230 can then utilize the service hosting domain/PLMN (or target-PLMN) information identified for a given DNN/service provided via the service hosting information 272 when performing a query to identify a NF, such as an SMF, that is to facilitate a session for the wireless device 206 for the given service.

Thus, broadly, some embodiments herein may facilitate providing target service hosting domain/PLMN information (e.g., target-PLMN-id) on a per-DNN (e.g., per-service) basis to a VPLMN AMF during registration of a wireless device with an HPLMN. The VPLMN AMF can then use the service hosting domain/PLMN information to query an NRF for a given service hosting domain/PLMN for selection of an NF (e.g., to facilitate a session of the wireless device to be provided a given service) for scenarios involving inter-domain NF selection.

For example, as illustrated in FIG. 2, consider as shown at 280 that, during registration with HPLMN 210 for establishing connection of wireless device 206 with VPLMN 230, the service hosting information 272 provided within the access and mobility information 270 for wireless device 206 is provided to AMF 231.

In at least one embodiment, the service hosting information 272, "{DNN-OI-replacement=IMS, domain/PLMN=5gc.east.mnc<123>.mcc<220>.3gppnetwork.org}," that identifies at least one service hosting DNN (DNN=IMS) and corresponding service hosting domain/PLMN (domain/PLMN=5gc.east.mnc<123>.mcc<220>.3gppnetwork.org) can be provided to AMF 231 within a registration response or registration accept message that is sent to AMF 231 (following a registration request message being sent to HPLMN 210) during registration of wireless device 206 with HPLMN 210. The service hosting information 272 "{DNN-OI-replacement=IMS, domain/PLMN=5gc.east.mnc<123>.mcc<220>.3gppnetwork.org}," can be stored by AMF 231 for future sessions that may be initiated for wireless device 206 for utilizing the IMS service (e.g., DNN=IMS) that is provided via the s-PLMN 220.

Thus, when the wireless device 206 registers, service hosting information 272 that identifies the "domain/PLMN" (e.g., a new parameter configured in the Access and Mobility subscription information 270 for wireless device 206) that the VPLMN 230 (AMF 231) should use when querying for an SMF for a given service hosting DNN is provided to AMF 231.

Thereafter, upon determining that a session for the IMS service (DNN=IMS) is to be established for the wireless device 206 (e.g., wireless device 206 initiates or is to receive a voice call, wireless device 206 seeks to establish a session for the IMS service, or any other appropriate mechanism/operation through which the AMF 231 may determine that an IMS session is to be established for the wireless device), the AMF 231 can identify, based on the service hosting information 272 "{DNN-OI-replacement=IMS, domain/PLMN=5gc.east.mnc<123>.mcc<220>.3gppnetwork.org}," obtained via the registration for the wireless device 206, that the domain/PLMN for the IMS DNN that is to be utilized for an NF query towards v-NRF 235 is "target-PLMN=5gc.east.mnc<123>.mcc<220>.3gppnetwork.org."

Thus, as shown at 281, AMF 231 can initiate an NF query, such as "Query(node-type=SMF, DNN=IMS, target-PLMN=5gc.east.mnc<123>.mcc<220>.3gppnetwork.org)," toward the v-NRF 235 in order to identify a NF, such as SMF 222, that is to serve/facilitate a session for the voice/IMS service for wireless device 206. As shown at 282, v-NRF 235 can perform the NF (SMF) query towards s-NRF 225, such as "Query(node-type=SMF, DNN=IMS, target-PLMN=5gc.east.mnc<123>.mcc<220>.3gppnetwork.org)". At 283a, s-NRF 125 responds with identifying information for SMF 222, such as "Response (SMF_FQDN=smf222_5gc.east.mnc<123>.mcc<220>.3gppnetwork.org, smf_profile)," in which the response is relayed back to AMF 231, as shown at 283b.

Thereafter, the session for the IMS service can be established for the wireless device 206 via SMF 222 and UPF 223 for the s-PLMN 220/IMS service domain, as prescribed by 3GPP standards, such as 3GPP TS 23.501, 23.502, etc.

As an alternative to the solution for the embodiments discussed above involving enhancing subscription information to include service hosting information for a wireless device stored/maintained via an HPLMN UDM/UDR, in some embodiments, AMF 231 of VPLMN 230 can be configured with "domain/target-PLMN-id" information on a per-HPLMN-per-DNN basis and/or on a per-wireless device basis. However, an advantage of the solution for the embodiments discussed above involving enhancing subscription information to include service hosting information for a wireless device stored/maintained via an HPLMN UDM/UDR, is that configuration of an AMF for a VPLMN is not needed.

As yet another alternative to the solution for the embodiments discussed above involving enhancing subscription information to include service hosting information for a wireless device stored/maintained via an HPLMN UDM/UDR, in some embodiments, v-NRF 235 of VPLMN can be configured with "domain/target-PLMN-id" information on a per-HPLMN-per-DNN basis and/or on a per-wireless device basis. However, configuring information for different PLMNs (e.g., s-PLMN 220 and HPLMN 210) within a given NRF of a VPLMN (e.g., v-NRF 235 of VPLMN 230) can create issues with NF identification/resolution for the VPLMN. Thus, an advantage of the solution for the embodiments discussed above involving enhancing subscription information to include service hosting information for a wireless device stored/maintained via an HPLMN UDM/UDR, is that configuration of a v-NRF for a VPLMN is not needed.

Figure 4:
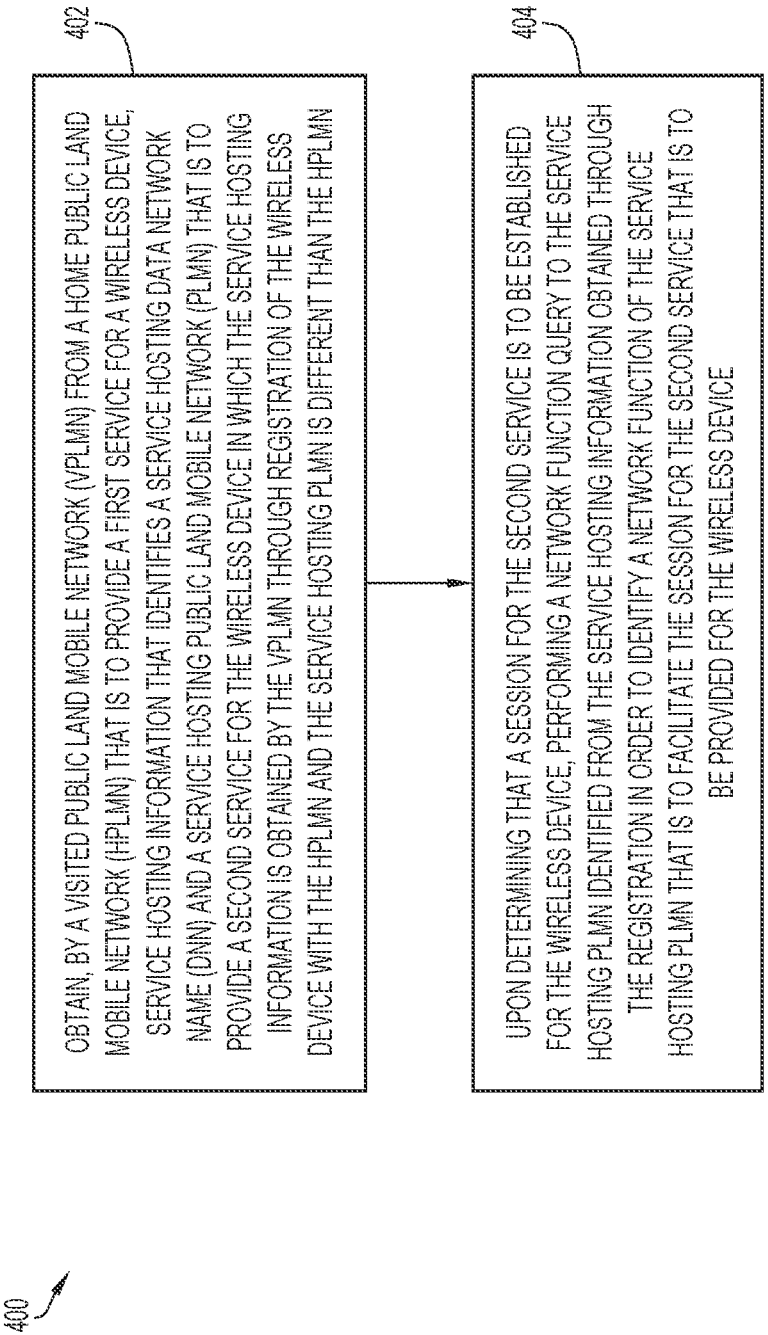
FIG. 4 is a flowchart depicting a method according to an example embodiment.

Referring to FIG. 4, FIG. 4 is a flowchart depicting a method 400 according to an example embodiment. In at least one embodiment, method 400 may be associated with techniques that may be utilized to facilitate service-based NF selection for roaming scenarios involving multiple home core networks. In various embodiments, method 400 may be performed by a computing device or combination of computing devices as discussed for embodiments herein, such as an AMF and an NRF for a visited PLMN, such as AMF 231 and v-NRF 235 of VPLMN 230.

As shown at 402, the method may include obtaining, by a visited public land mobile network (VPLMN) from a home public land mobile network (HPLMN) that is to provide a first service for a wireless device, service hosting information that identifies a service hosting data network name (DNN) and a service hosting public land mobile network (PLMN) (e.g., an IMS service hosting PLMN, such as s-PLMN 220) that is to provide a second service for the wireless device in which the service hosting information is obtained by the VPLMN through registration of the wireless device with the HPLMN and the service hosting PLMN is different than the HPLMN.

For example, the service hosting information can be stored within access and mobility subscription information maintained for the wireless device within a UDM/UDR of the HPLMN, such as within service hosting information 272 stored within access and mobility subscription information 270 maintained for wireless device 206 within UDM/UDR 214 of HPLMN 210. In one example, the service hosting information 270 can be included in a registration response message that is obtained by an AMF of the VPLMN, such as obtained by AMF 231 of VPLMN 230 during registration of wireless device 206 with HPLMN 210. In one instance, the service hosting DNN can be included in a first field of the service hosting information and the service hosting PLMN can be included in a second field of the service hosting information. In another instance, the service hosting DNN and the service hosting PLMN can both be included in a single field of the service hosting information in which the service hosting PLMN and the service hosting DNN can be separated by a delineating character.

At 404, the method may include upon determining that a session for the second service is to be established for the wireless device, performing a network function query to the service hosting PLMN identified from the service hosting information obtained through the registration in order to identify a network function of the service hosting PLMN that is to facilitate the session for the second service that is to be provided for the wireless device.

In one example, performing the network function query to the service hosting PLMN can include identifying, by the AMF of the VPLMN, the service hosting PLMN identified for the service hosting DNN within the service hosting information and initiating, by the AMF of the VPLMN, the network function query towards a NRF (e.g., v-NRF 235) of the VPLMN that includes the service hosting DNN and the service hosting PLMN in which the NRF of the VPLMN performs the network function query to a NRF of the service hosting PLMN in order to identify the network function of the service hosting PLMN that is to facilitate the session for the second service that is to be provided for the wireless device. In one instance, the network function that is to facilitate the session for the second service that is to be provided for the wireless device is an SMF of the service hosting PLMN.

Thus, broadly, embodiments herein may facilitate providing a target-PLMN-id per DNN (for each of one or more service hosting domains/PLMNs) to an AMF of a VPLMN as part of subscription information for a wireless device that is sent to the AMF of the VPLMN during registration of the wireless device with an HPLMN. The AMF of the VPLMN can use this information in a query to an NRF of a given service hosting domain/PLMN for selection of a NF in cases of inter-domain NF selection. Thus, for roaming cases, a solution can be provided for a network operator where traffic for a wireless device can be routed to a service hosting PLMN for a given service, such as IMS, and to a different HPLMN for traffic for another service, such as data/internet service. As mobile network technology moves to core network as a service (CNaaS) deployments it will be more common to have "service-based" core network selection, which can, thus, be provided by embodiments as discussed herein.

Figure 5:
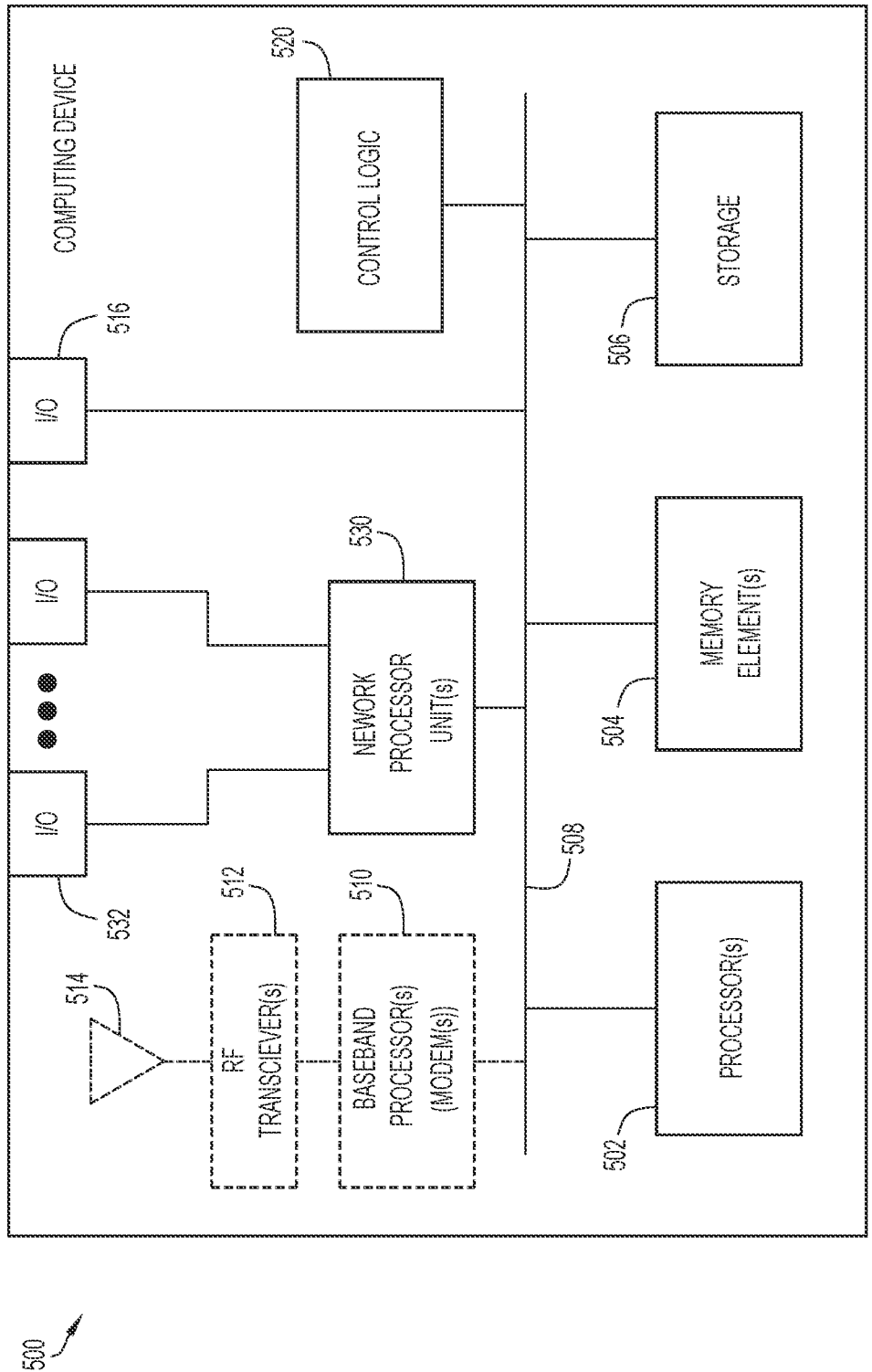
FIG. 5 is a hardware block diagram of a computing device that may perform functions associated with any combination of operations discussed in connection with techniques described for embodiments herein.

Referring to FIG. 5, FIG. 5 illustrates a hardware block diagram of a computing device 500 that may perform functions associated with operations discussed herein in connection with the techniques depicted via FIGS. 2, 3, and 4. In various embodiments, a computing device or apparatus, such as computing device 500 or any combination of computing devices 500, may be configured as any entity/entities as discussed for the techniques depicted in connection with operations illustrated/discussed for various embodiments herein, such as, wireless device 206, AMF 231, v-NRF 235, UDM/UDR 214, s-NRF 225, and/or any other elements/functions/nodes discussed herein.

In at least one embodiment, the computing device 500 may be any apparatus that may include one or more processor(s) 502, one or more memory element(s) 504, storage 506, a bus 508, one or more network processor unit(s) 530 interconnected with one or more network input/output (I/O) interface(s) 532, one or more I/O interface(s) 516, and control logic 520. In various embodiments, instructions associated with logic for computing device 500 can overlap in any manner and are not limited to the specific allocation of instructions and/or operations described herein.

For embodiments in which computing device 500 may be implemented as any device capable of wireless communications (e.g., a gNB, wireless device 206 etc.), computing device 500 may further include at least one baseband processor or modem 510, one or more radio RF transceiver(s) 512 (e.g., any combination of RF receiver(s) and RF transmitter(s)), one or more antenna(s) or antenna array(s) 514.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 530 may enable communication between computing device 500 and other systems, entities, etc., via network I/O interface(s) 532 (wired and/or wireless) to facilitate operations discussed for various embodiments described herein. In various embodiments, network processor unit(s) 530 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 532 can be configured as one or more Ethernet port(s), Fibre Channel ports, any other I/O port(s), and/or antenna(s)/antenna array(s) now known or hereafter developed. Thus, the network processor unit(s) 530 and/or network I/O interface(s) 532 may include suitable interfaces for receiving, transmitting, and/or otherwise communicating data and/or information (wired and/or wirelessly) in a network environment.

I/O interface(s) 516 mallow for input and output of data and/or information with other entities that may be connected to computing device 500. For example, I/O interface(s) 516 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 500 is implemented as a wireless device or any apparatus capable of wireless communications, the RF transceiver(s) 512 may perform RF transmission and RF reception of wireless signals via antenna(s)/antenna array(s) 514, and the baseband processor or modem 510 performs baseband modulation and demodulation, etc. associated with such signals to enable wireless communications for computing device 500.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, by a visited public land mobile network (VPLMN) from a home public land mobile network (HPLMN) that is to provide a first service for a wireless device, service hosting information that identifies a service hosting data network name (DNN) and a service hosting public land mobile network (PLMN) that is to provide a second service for the wireless device, wherein the service hosting information is obtained by the VPLMN through registration of the wireless device with the HPLMN and the service hosting PLMN is different than the HPLMN; and upon determining that a session for the second service is to be established for the wireless device, performing a network function query to the service hosting PLMN identified from the service hosting information obtained through the registration in order to identify a network function of the service hosting PLMN that is to facilitate the session for the second service that is to be provided for the wireless device.

The service hosting information can be stored within access and mobility subscription information maintained for the wireless device within a Unified Data Management (UDM) or a Unified Data Repository (UDR) entity of the HPLMN. In one instance, the service hosting PLMN is identified within a PLMN identifier field of a data structure that identifies the service hosting DNN that is stored for the wireless device within the UDM or the UDR of the HPLMN.

In one instance, the obtaining is performed by an access and mobility management function (AMF) of the VPLMN. In one instance, the service hosting information is included a registration response message that is obtained by the AMF of the VPLMN from a Unified Data Management (UDM) entity or a Unified Data Repository (UDR) of the HPLMN during registration of the wireless device with the HPLMN.

In one instance, performing the query to the service hosting PLMN includes: identifying, by the AMF of the VPLMN, the service hosting PLMN identified for the service hosting DNN within the service hosting information; and initiating, by the AMF of the VPLMN, the network function query towards a Network Repository Function (NRF) of the VPLMN that includes the service hosting DNN and the service hosting PLMN, wherein the NRF of the VPLMN performs the network function query to a NRF of the service hosting PLMN in order to identify the network function of the service hosting PLMN that is to facilitate the session for the second service that is to be provided for the wireless device.

In one instance, the service hosting DNN is included in a first field of the service hosting information and the service hosting PLMN is included in a second field of the service hosting information. In one instance, the service hosting DNN and the service hosting PLMN are both included in a single field of the service hosting information and the service hosting PLMN and the service hosting DNN are separated by a delineating character.

Thus, broadly, embodiments herein may facilitate providing a target-PLMN-id per DNN (for each of one or more service hosting domains/PLMNs) to an AMF of a VPLMN as part of subscription information for a wireless device that is sent to the AMF of the VPLMN during registration of the wireless device with an HPLMN. The AMF of the VPLMN can use this information in a query to an NRF of a given service hosting domain/PLMN for selection of a NF in cases of inter-domain NF selection. Thus, for roaming cases, a solution can be provided for a network operator where traffic for a wireless device can be routed to a service hosting PLMN for a given service, such as IMS, and to a different HPLMN for traffic for another service, such as data/internet service. As mobile network technology moves to a core network as a service (CNaaS) model, it will be more common to have "service-based" core network selection, which can be provided by embodiments as discussed herein. Thus, embodiments herein may provide valuable techniques that can utilized in scenarios in which an HPLMN/NFs can be deployed alongside other vendor service hosting networks/NFs.

VARIATIONS AND IMPLEMENTATIONS

It is to be understood that the core network functions illustrated for the core networks of FIG. 2 are provided for illustrative purposes only and are not meant to limit the broad scope of embodiments herein. Other network functions can be provided for each core network in accordance with any appropriate core network standards, such as 3GPP standards and/or the like.

Generally, per-3GPP standards for a core network, often referred to as a mobile core network, an AMF interfaces with an SMF which can further interface with one or more UPFs. An AMF and an SMF can further interface with a Policy Control Function (PCF), an NRF, a UDM/UDR, and various other core network functions via a 3GPP Service-Based Interface (SBI). An AMF and a UPF can further interface with a radio access network (RAN) node, such as one or more gNBs.

One or more wireless device sessions, often referred to as Protocol Data Unit (PDU) sessions can be established between a wireless device and a UPF for a core network in which the session may be facilitated/managed by an SMF, as is generally understood in the art.

Generally, a radio access may include one or more radio access network (RAN) nodes that may implement a wireless wide area (WWA) (e.g., cellular) air interface and, in some instances also a wireless local area (e.g., Wi-Fi®) air interface, for any combination of Radio Access Technology (RAT) types (e.g., 'accesses') for, 3GPP WWA licensed spectrum accesses (e.g., Fourth Generation/Long Term Evolution (4G/LTE), 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP licensed/unlicensed spectrum wireless local area (WLA) accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus a RAN node may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more wireless devices (e.g., wireless device 206), may utilize to connect to one or more RAN nodes for one or more sessions (e.g., voice/IMS, data/internet (e.g., video, gaming, etc.), combinations thereof, etc.).

A wireless device, such as wireless device 206, and any other wireless devices discussed herein, may be considered any electronic device, user equipment (UE), etc. that initiates a connection or communication session with a corresponding core network, and may be inclusive of but not limited to a computer, a mobile phone or mobile communication device, an electronic tablet, a laptop, etc. an electronic device such as an industrial device (e.g., a robot), automation device, enterprise device, appliance, Internet of Things (IoT) device (e.g., sensor, monitor, meter (parking meter, gas meter, water meter, etc.), traffic light, camera/surveillance device, smart device, etc.), a router with a WWA/WLA interface, a WWA/WLA (cellular/Wi-Fi®) enabled device. and/or any other device, component, element, or object capable of initiating voice, audio, video, media, or data exchanges within a system. Thus, a wireless device may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes of a RAN, for one or more sessions with one or more core networks, such as a session with HPLMN 210 for internet/data service and a session s-PLMN 220 for IMS service.

Generally, an AMF may facilitate access and mobility management control/services for one or more UEs. Generally, an SMF may be responsible for wireless device session management, with individual functions/services being supported on a per-session basis in order to facilitate data transfer(s) between a wireless device and one or more networks via one or more UPFs. Generally, a UPF may operate to provide packet routing and forwarding operations for user data traffic and may also perform a variety of functions such as packet inspection, traffic optimization, Quality of Service (QoS), policy enforcement and user data traffic handling (e.g., to/from one or more data networks), and billing operations (e.g., accounting, etc.) for wireless device sessions. Typically, a UDM stores subscription data (typically in combination with a Unified Data Repository (UDR)) for subscribers (e.g., a user associated with a given wireless device) that can be retrieved and/or otherwise obtained/utilized during operation of a core network system. Typically, an NRF provides support for NF management (e.g., registering, deregistering, updating services to NFs/NF services), NF discovery (e.g., enabling NF service consumer(s) to discover a set of NF instances with a specific NF service/NF type and/or to discover a specific NF service), and NF access (e.g., NF authorization), among others as provided via 3GPP standards.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining, by a visited public land mobile network (VPLMN) from a home public land mobile network (HPLMN) that is to provide a first service for a wireless device, service hosting information that identifies a service hosting data network name (DNN) and a service hosting public land mobile network (PLMN) that is to provide a second service for the wireless device, wherein the service hosting information is obtained by the VPLMN through registration of the wireless device with the HPLMN and the service hosting PLMN is different than the HPLMN; and
   upon determining that a session for the second service is to be established for the wireless device, performing a network function query to the service hosting PLMN identified from the service hosting information obtained through the registration in order to identify a network function of the service hosting PLMN that is to facilitate the session for the second service that is to be provided for the wireless device.

2. The method of claim 1, wherein the service hosting information is stored within access and mobility subscription information maintained for the wireless device within a Unified Data Management (UDM) or a Unified Data Repository (UDR) entity of the HPLMN.

3. The method of claim 2, wherein the service hosting PLMN is identified within a PLMN identifier field of a data structure that identifies the service hosting DNN that is stored for the wireless device within the UDM or the UDR of the HPLMN.

4. The method of claim 1, wherein the obtaining is performed by an access and mobility management function (AMF) of the VPLMN.

5. The method of claim 4, wherein the service hosting information is included a registration response message that is obtained by the AMF of the VPLMN from a Unified Data Management (UDM) entity or a Unified Data Repository (UDR) of the HPLMN during registration of the wireless device with the HPLMN.

6. The method of claim 5, wherein performing the network function query to the service hosting PLMN includes:
   identifying, by the AMF of the VPLMN, the service hosting PLMN identified for the service hosting DNN within the service hosting information; and
   initiating, by the AMF of the VPLMN, the network function query towards a Network Repository Function (NRF) of the VPLMN that includes the service hosting DNN and the service hosting PLMN, wherein the NRF of the VPLMN performs the network function query to a NRF of the service hosting PLMN in order to identify the network function of the service hosting PLMN that is to facilitate the session for the second service that is to be provided for the wireless device.

7. The method of claim 1, wherein the service hosting DNN is included in a first field of the service hosting information and the service hosting PLMN is included in a second field of the service hosting information.

8. The method of claim 1, wherein the service hosting DNN and the service hosting PLMN are both included in a single field of the service hosting information and the service hosting PLMN and the service hosting DNN are separated by a delineating character.

9. One or more non-transitory computer readable storage media encoded with instructions that, when executed by a processor, cause the processor to perform operations, comprising:
   obtaining, by a visited public land mobile network (VPLMN) from a home public land mobile network (HPLMN) that is to provide a first service for a wireless device, service hosting information that identifies a service hosting data network name (DNN) and a service hosting public land mobile network (PLMN) that is to provide a second service for the wireless device, wherein the service hosting information is obtained by the VPLMN through registration of the wireless device with the HPLMN and the service hosting PLMN is different than the HPLMN; and
   upon determining that a session for the second service is to be established for the wireless device, performing a network function query to the service hosting PLMN identified from the service hosting information obtained through the registration in order to identify a network function of the service hosting PLMN that is to facilitate the session for the second service that is to be provided for the wireless device.

10. The media of claim 9, wherein the service hosting information is stored within access and mobility subscription information maintained for the wireless device within a Unified Data Management (UDM) or a Unified Data Repository (UDR) entity of the HPLMN.

11. The media of claim 10, wherein the service hosting PLMN is identified within a PLMN identifier field of a data structure that identifies the service hosting DNN that is stored for the wireless device within the UDM or the UDR of the HPLMN.

12. The media of claim 9, wherein the obtaining is performed by an access and mobility management function (AMF) of the VPLMN and the service hosting information is included a registration response message that is obtained by the AMF of the VPLMN from a Unified Data Management (UDM) entity or a Unified Data Repository (UDR) of the HPLMN during registration of the wireless device with the HPLMN.

13. The media of claim 12, wherein performing the network function query to the service hosting PLMN includes:
   identifying, by the AMF of the VPLMN, the service hosting PLMN identified for the service hosting DNN within the service hosting information; and
   initiating, by the AMF of the VPLMN, the network function query towards a Network Repository Function (NRF) of the VPLMN that includes the service hosting DNN and the service hosting PLMN, wherein the NRF of the VPLMN performs the network function query to a NRF of the service hosting PLMN in order to identify the network function of the service hosting PLMN that is to facilitate the session for the second service that is to be provided for the wireless device.

14. The media of claim 9, wherein one of:
   the service hosting DNN is included in a first field of the service hosting information and the service hosting PLMN is included in a second field of the service hosting information; or
   the service hosting DNN and the service hosting PLMN are both included in a single field of the service hosting information and the service hosting PLMN and the service hosting DNN are separated by a delineating character.

15. A system comprising:
   at least one memory element for storing data; and
   at least one processor for executing instructions associated with the data, wherein executing the instructions causes the system to perform operations, comprising:
      obtaining, by a visited public land mobile network (VPLMN) from a home public land mobile network (HPLMN) that is to provide a first service for a wireless device, service hosting information that identifies a service hosting data network name (DNN) and a service hosting public land mobile network (PLMN) that is to provide a second service for the wireless device, wherein the service hosting information is obtained by the VPLMN through registration of the wireless device with the HPLMN and the service hosting PLMN is different than the HPLMN; and
      upon determining that a session for the second service is to be established for the wireless device, performing a network function query to the service hosting PLMN identified from the service hosting information obtained through the registration in order to identify a network function of the service hosting PLMN that is to facilitate the session for the second service that is to be provided for the wireless device.

16. The system of claim 15, wherein the obtaining is performed by an access and mobility management function (AMF) of the VPLMN.

17. The system of claim 16, wherein the service hosting information is included a registration response message that is obtained by the AMF of the VPLMN from a Unified Data Management (UDM) entity or a Unified Data Repository (UDR) of the HPLMN during registration of the wireless device with the HPLMN.

18. The system of claim 17, wherein performing the network function query to the service hosting PLMN includes:
   identifying, by the AMF of the VPLMN, the service hosting PLMN identified for the service hosting DNN within the service hosting information; and
   initiating, by the AMF of the VPLMN, the network function query towards a Network Repository Function (NRF) of the VPLMN that includes the service hosting DNN and the service hosting PLMN, wherein the NRF of the VPLMN performs the network function query to a NRF of the service hosting PLMN in order to identify the network function of the service hosting PLMN that is to facilitate the session for the second service that is to be provided for the wireless device.

19. The system of claim 15, wherein the service hosting DNN is included in a first field of the service hosting information and the service hosting PLMN is included in a second field of the service hosting information.

20. The system of claim 15, wherein the service hosting DNN and the service hosting PLMN are both included in a single field of the service hosting information and the service hosting PLMN and the service hosting DNN are separated by a delineating character.

* * * * *